United States Patent [19]

Takiguchi

[11] 3,729,104
[45] Apr. 24, 1973

[54] WORK-TRANSPORT APPARATUS

[75] Inventor: Taisuke Takiguchi, Funabashi, Japan

[73] Assignee: Kabushiki Kaisha Daini Seikosha, Tokyo, Japan

[22] Filed: July 14, 1971

[21] Appl. No.: 162,494

[30] Foreign Application Priority Data

July 14, 1970 Japan................................45/61041

[52] U.S. Cl....................................214/8.5 K, 53/242
[51] Int. Cl..................................................B65g 59/06
[58] Field of Search ......................214/85. K, 8.5 R, 214/8.5 A; 53/242

[56] References Cited

UNITED STATES PATENTS 3,371,803    3/1968    Hosch............................214/8.5 A X
3,583,579    6/1971    Triggs............................214/8.5 A X Primary Examiner—Robert G. Sheridan
Assistant Examiner—George F. Abraham
Attorney—Robert E. Burns et al.

[57] ABSTRACT

A work-transport method and apparatus for transporting workpieces, such as watch movement assemblies, in stacked relationship in individual compartments of a work container moved reciprocably over a rotary work table. The workpieces are held in frames within the compartments. The frames are removed automatically from the compartments individually and inserted in work-receiving openings or holes in the rotary table. The workpieces are then automatically returned after work operations have been performed thereon, to the original compartment in which the workpieces were stored and removed therefrom.

4 Claims, 15 Drawing Figures

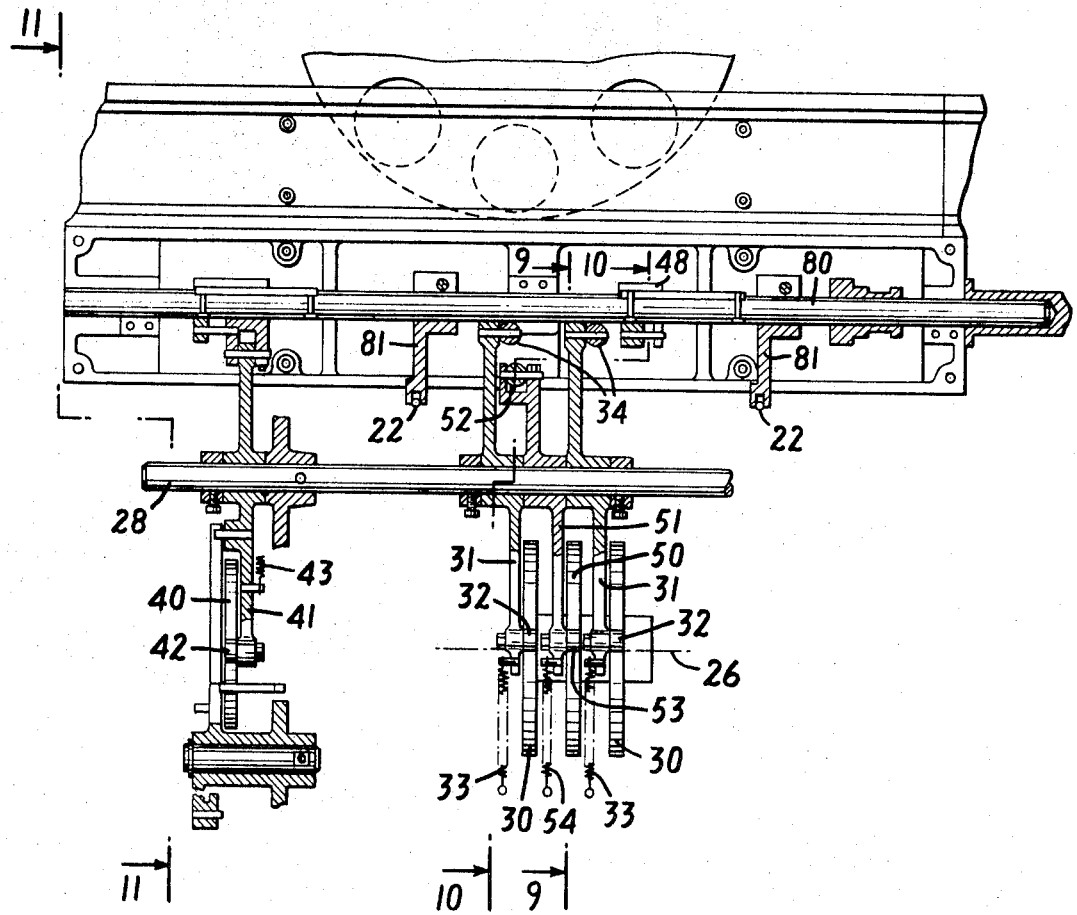

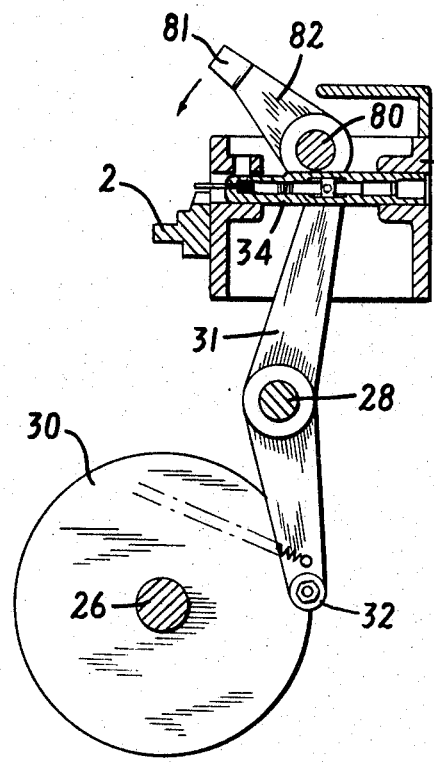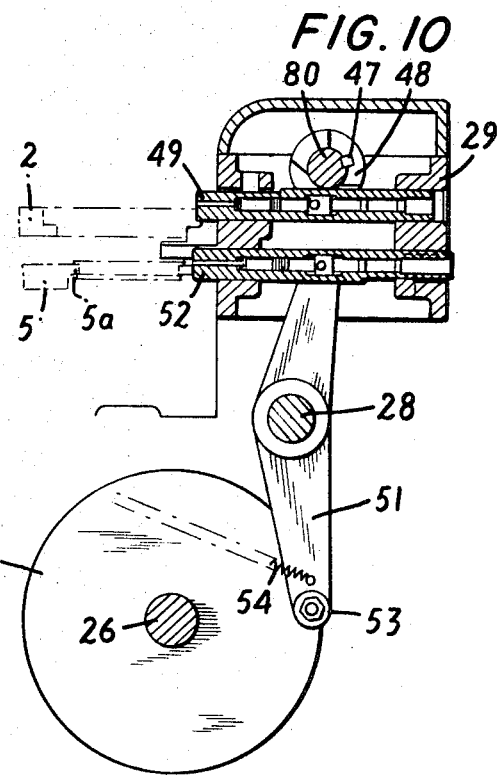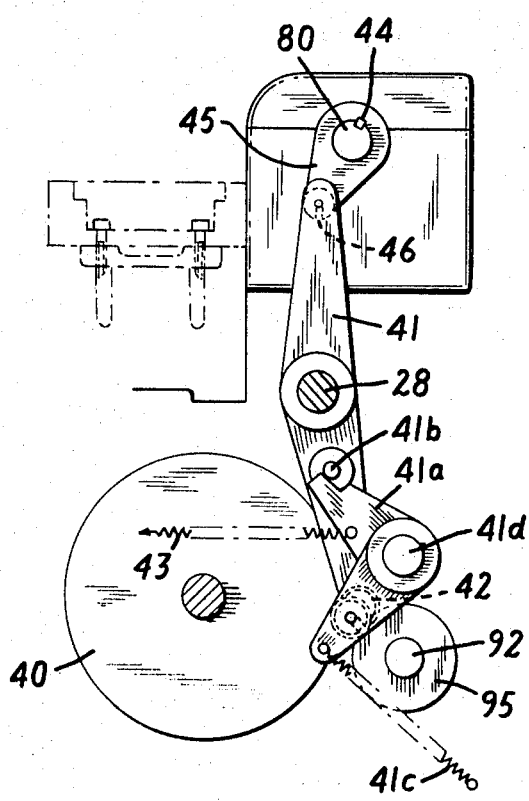

Patented April 24, 1973 3,729,104

Patented April 24, 1973

WORK-TRANSPORT APPARATUS

BACKGROUND OF THE INVENTION

This invention relates to parts transporting apparatus and more particularly to such an apparatus for use in transporting assemblis or parts to be machined or assembled, such as movements of watches.

DESCRIPTION OF PRIOR ART

In order to prevent workpieces, such as the movement of a watch, from being exposed to dust, it is necessary to remove the workpieces usually stacked in a protective housing (hereinafter referred to as a container) therefrom and then return them to their original place after being assembled or machined for transporting into a next assembling step or station.

The assembly transportin apparatus of this kind have long been devised for application to assembly-line production. For example, there has usually been used a parts or assembly transporting apparatus in which a pair of cylindrical containers respectively having a plurality of compartments therein are provided over a work table so that the workpieces to be assembled can be automatically extracted or removed from any compartment of one container onto the work table and returned to the corresponding compartment of another container after one of the assembly steps has been finished. It, however, requires the exchange of a pair of containers for each other or replacement of them by another container whenever one assembly step has been finished with the result that the workpieces taken out to be assembled form one of a pair of containers must be accumulated in another container after being assembled. This requires sophisticated manual-handling in handling delicate parts and further that such a transporting apparatus cannot be applied for assembly-line production, especially for assembly-line production of the movements of watches because their assembly has several complicated work steps.

SUMMARY OF THE INVENTION

An object of the present invention is to provide an improved parts or assembly-transport method and apparatus wherein assembly-line production is established with a plurality of assembly transporting apparatus series connected with each other for allowing sequentially performing different assembly steps of a movement of a watch at each assembly or work station.

Another object of the invention is to provide an improved assembly-transport method and apparatus by which the various kinds of assembling steps can be accomplished in sequence at one assembly or work station in such a manner that the container in which the watch movements to be assembled or worked on are stacked is transported to the following assembly station from the right to the left side, or vice versa at one work station until the completion of a complex assembly process or step is accomplished.

Still another object of the invention is to provide an improved assembly-transport method and apparatus in which a plurality of containers can be connected in series with each other for carrying out the more complicated assembly steps.

According to the invention, workpieces, such as the movements of watches, set in frames, are disposed stacked in each of a plurality of compartments provided within a transport container, and then sequentially removed one by one by means of a shutter ring from one compartment of that container onto one of several circular work-receiving hollows disposed angularly spaced circumferentially on a rotary table in equally spaced relationship.

After the completion of distribution of the workpieces to be assembled onto the rotary work table, during which one assembly step is carried out, the container is intermittently transported horizontally along guide rails from the right to the left or vice versa so that another compartment in which the workpieces to be assembled or worked on are arranged can be disposed directly aligned with one of the circular hollows of the rotary work table while the container emptied due to the completion of distribution in which those assembled parts were stacked can also be directly aligned with one of circular hollows in which one of those assemblies is set. The sequential operations on the workpieces delivered onto the rotary table is effected in synchronism with the automatic restoring operation of those assemblies or parts worked on into their original compartment with the container transported in such a manner as described above every time upon the completion of one revolution of the rotary table.

BRIEF DESCRIPTION OF THE DRAWINGS

The above-mentioned objects and features of the invention will be more fully described in connection with the accompanying drawings illustrating an embodiment of an assembly-transport method and apparatus according to the present invention.

FIG. 8 is a fragmentary section view cam-lever mechanisms of the assembly-transport apparatus by which a shutter ring is operated and the container is fixed;

FIG. 9 is a section view taken on section line 9—9 of FIG. 8;

FIG. 10 is a section view taken on section line 10 in FIG. 8;

FIG. 11 is a section view taken on section line 11—11 in FIG. 8;

DESCRIPTION OF THE PREFERRED EMBODIMENTS

Figure 1:
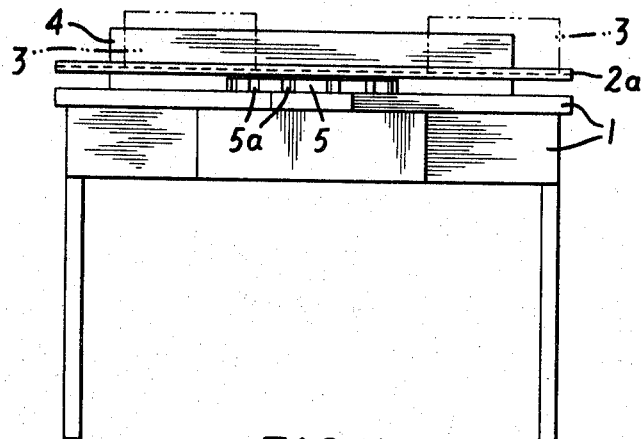
FIG. 1 is a schematic front elevation view of an assembly-transport apparatus according to the invention.
Figure 2:
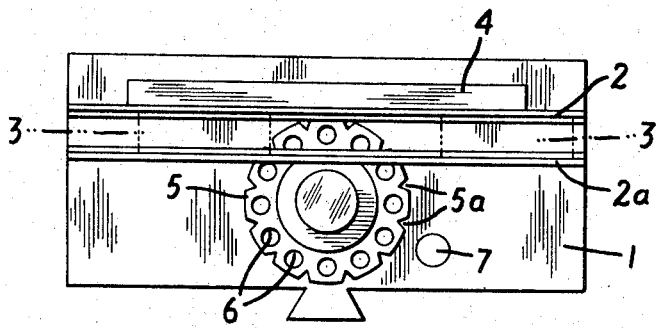
FIG. 2 is a schematic plan view of an assembly-transport apparatus of FIG. 1.

Referring now to FIGS. 1 and 2, there is shown a work station 1 on a central po tion of which is mounted a rotary work station or table 5 having a plurality of circular work-receiving hollows 6 equally spaced circumferentially of its pivot or center. The rotary work table has peripheral notches 5a for angularly positioning releasably in fixed angular positions the rotary work station 5 as described hereinafter in detail. A container 3 in which workpieces to be assembled or worked on are transported is disposed slidable relative to a pair of guide rails 2 and 2a fixed in parallel on the work station or table 1. The container is transported from the right to the left or vice versa by means of a shifting cam-lever mechanism of an assembly-transport apparatus 4 after the distribution of workpieces into each of the corresponding work-receiving circular hollows 6 as fully described hereinafter. Adjacent to the rotary work station or table 5 is provided a lubrication unit 7 for automatically effecting the maintenance or lubrication of the mechanical parts of the assembly-transport apparatus.

Figure 4:
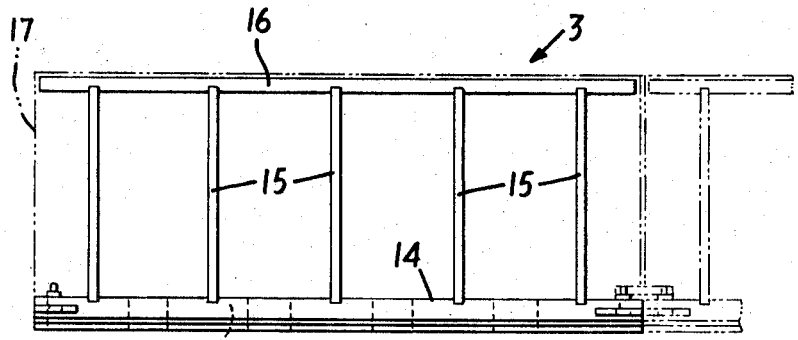
FIG. 4 is a schematic front view of a container according to the invention.
Figure 5:
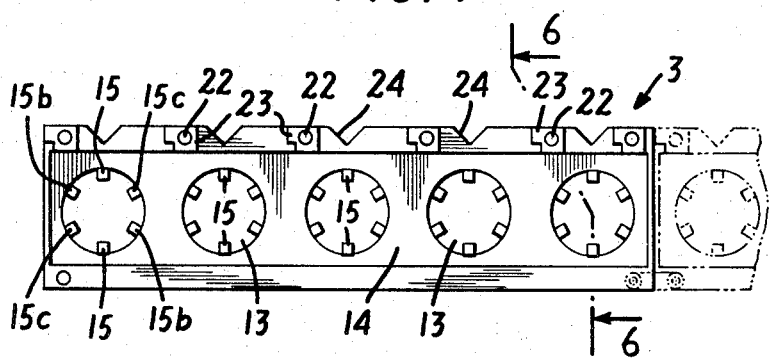
FIG. 5 is a schematic plan view of the container of FIG. 4.

The container 3, as shown in FIGS. 4 and 5, comprises a base plate 14 having a plurality of through openings 13 provided in equally spaced relationship through which workpieces, for example watch movements, are introduced into or taken out of the container by means of a shutter ring 19 described later and having V-type notches or grooves 24 for positioning of the container 3 and each corresponding to one of the openings 13, respectively. A plurality of guide columns 15 equally spaced angularly are fixedly mounted in pairs adjacent to each of the openings 13, respectively, supporting a cover plate 16. The whole of the container 3 is usually covered with a transparent covering 17 such as vinyl chrolide. The container 3, if desired, may be constituted so as to be connectable in series with other similar containers by means of suitable devices for use in complicated assembly processes.

Figure 3:
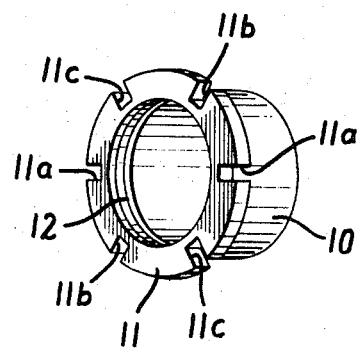
FIG. 3 is a perspective view of a frame into which a workpiece to be assembled or worked on is set and which is housed in a compartment of a container.
Figure 6:
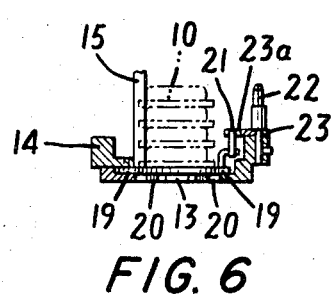
FIG. 6 is a vertical section view taken on a section line 6—6 in FIG. 5 illustrating a stack of frames of FIG. 3.

As mentioned before, the workpieces to be assembled or worked on, for example machined, are introduced into each of the compartments divided by the guide columns 15 with each of the workpieces respectively set in a corresponding frame 10 shown in FIG. 3. The frame 10 has a flange 11 at one end provided with peripheral notches 11a engaged with the guide columns 15, and other peripheral notches 11b and 11c in engagement with projections 15b and 11c (also shown at 20 in FIG. 6) of the shutter ring 19 pivotably mounted on the back of the base plate 14 in alignment with the openings 13.

Figure 15:
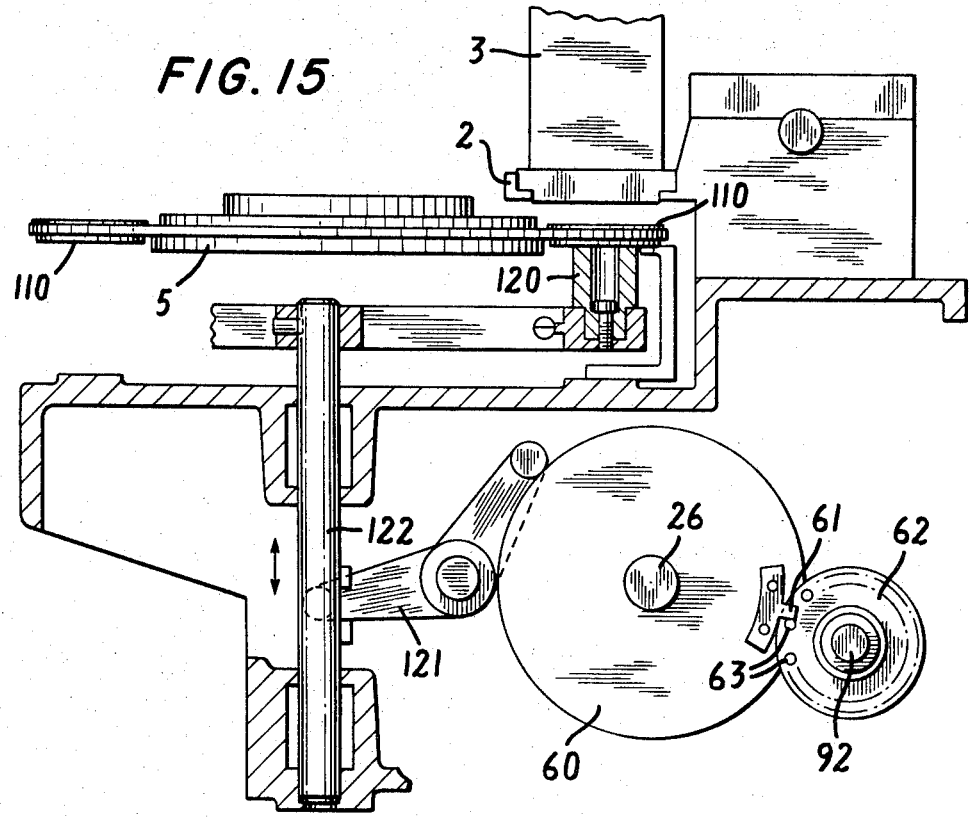
FIG. 15 is an elevation view partly in section of a cam-lever mechanism by which a thrusting rod is raised up to lift the frames for restoring assemblies to the containers.

A cam-lever mechanism is provided by which a plurality or stack of workpieces set in frames 10 are sequentially taken out from one of the compartments of the container 3 onto corresponding ones of the circular hollows 6 of the rotary work station 5 and returned to their original compartment in the container 3. This mechanism is shown in FIGS. 6 to 9. The cam-lever mechanism comprises a cam shaft 26, see FIGS. 7 and 8, which is rotated at a speed of about 40 to 60 revolutions per minute by means of an electric motor (not shown) through a worm gear 25 and on which are mounted a pair of shutter cams 30 for operating the shutter ring 19. A cam 50 indexes the rotary table or work station 5. A cam 60 pushes up a thrusting rod 120, FIG. 15, and other cams 40, 83 and 100 are provided and described later.

With reference to FIGS. 8 and 9, a lever 31 is pivotally mounted on a fixed shaft 28 and has at one end a roller or cam follower 32 provided in close contact with the surface of the shutter cam 30 and has another end fixed to a pushing pin 34. A clockwise rotation of the shutter cam 30 allows the lever 31 to turn in a counter-clockwise direction, thus thrusting the pushing pin 34 out of a housing 29 of the assembly transporting apparatus. The push pin 34, when thrust out, strikes against an L-type actuating plate 23, see FIGS. 5 and 6, pivotally mounted on a shutter axle 22 vertically attached to the base plate 14. The L-type actuating plate 23 has at its extremity a groove 23a with which a pin 21 is always in mesh at one end and fixed to the shutter ring 19 at another end, so that the impact of the push pin 34 against the L-type actuating plate 23 causes the latter to turn about the shutter axle 22 and thus the shutter ring 19 to rotate at some angle about the center thereof. The shutter ring 19, when in a neutral position, carries the frame 10 in which the workpiece is arranged, preventing the frame 10 from dropping onto the rotary work table 5, because the projections 15b and 15c do not hold in engagement with the notches 11b and 11c, FIGS. 3 and 5. On the other hand, when the shutter ring 19 is rotated by some angle due to the thrust of the push pin 34, the projections 15b and 15c thereof engage with the corresponding notches 11b and 11c whereupon the frame 10 with the workpiece is delivered in one of the circular work-receiving hollows 6 directly under a stack of workpieces in the compartment of the container 3. Another cam-lever mechanism raises the frame 10 into the compartment of the container 3 in cooperation with the cam-lever mechanism as mentioned above as later described.

In order to avoid the fluctuation of the rotary table 5 during an assembly operation a lock mechanism is provided, FIGS. 8 and 10, in which a push pin 52 is inserted into one of the notches 5a of the rotary table 5 with the latter fixed thereto not to fluctuate since a lever 51 swings about the fixed shaft 28 against the force of a spring 54 as the cam 50 for indexing or angularly positioning the rotary table 50 rotates about the shaft 26 through a roller 53 in the same manner as mentioned in the mechanism of the operation of the shutter ring 19.

Figure 7:
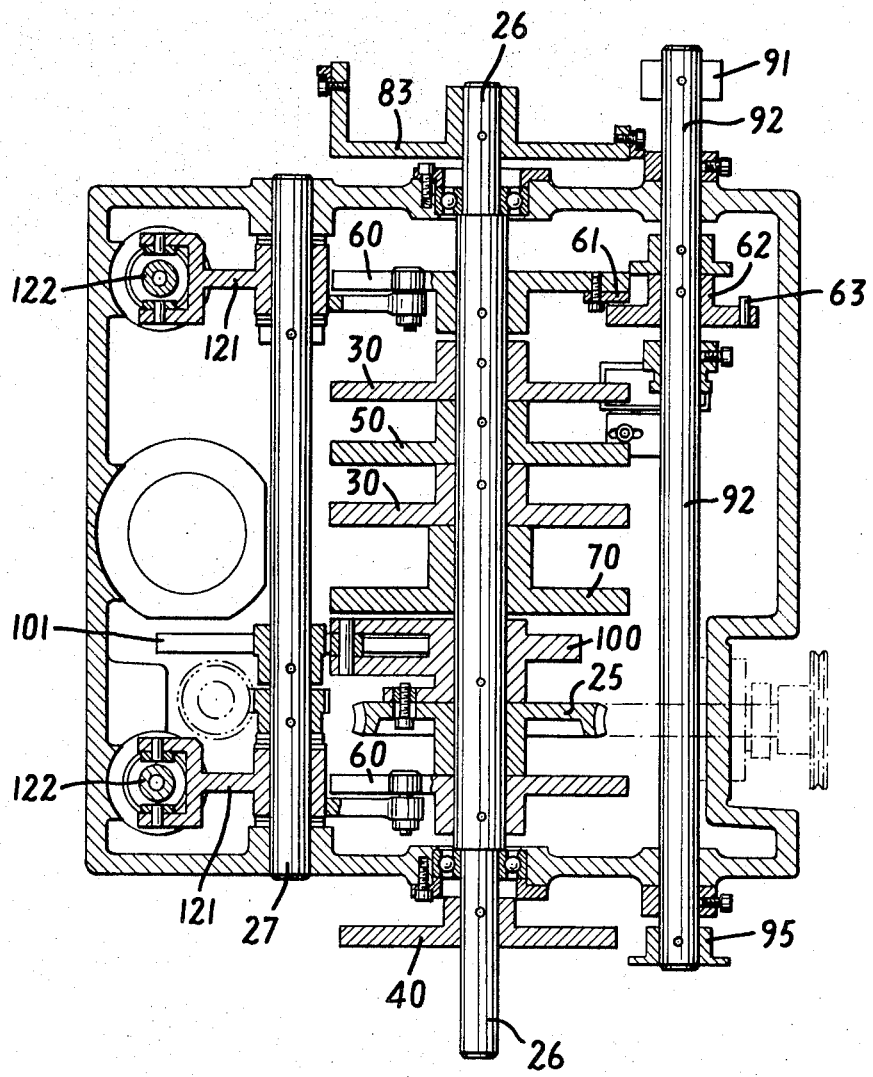
FIG. 7 is a section of cam mechanisms of the assembly transport apparatus according to the invention.
Figure 14:
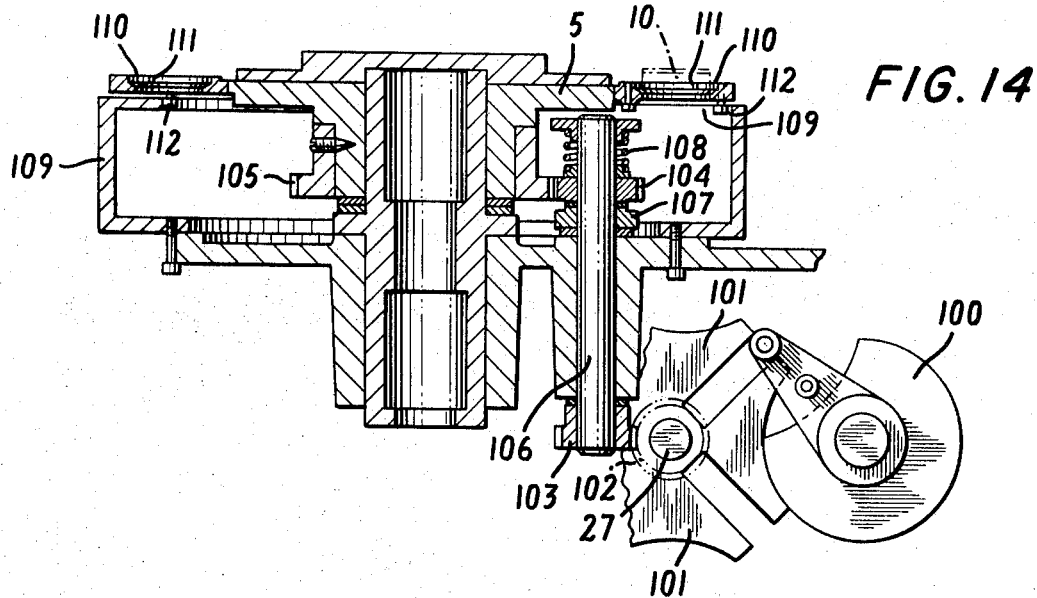
FIG. 14 is a cross-section view of a rotary work table.

Describing next a mechanism with reference to FIGS. 7 and 14 by which the rotary work table 5 intermittently rotates to transport the workpieces to be assembled into the place where the assembling work is carried out, a power-transmitting wheel 100 of the Geneve-type mechanism, which has the same revolution as other cams 30, 50 etc., is used to transmit the intermittent driving power to a shaft 27 by way of a follower 101 fixedly mounted thereon, thereby rotating a shaft 106 by means of bevel gears 102 and 103. The intermittent revolution of the shaft 106 induces the intermittent rotation of a larger gear 105 in engagement with a gear 104 which is maintained in frictional contact with the shaft 106 since the force of a spring 108 presses the gear 104 on a flange 107 of the shaft 106.

Consequently, one revolution of the wheel 100 permits the rotary table 5 to intermittently rotate by as little as one-thirteenth revolution because of reduction mechanism gears 102 to 105. The frictional contact of the gear 104 with the shaft 106 functions such that the rotary table 5 when loaded with force, caused by careless operation, ceases to rotate irrespective of the revolution of the shaft 106. In this case, it should be noted that the rotary table 5 is released by a release mechanism, described hereinafter, from the lock mechanism which positions the rotary work table 5 by means of the pushing pin 52 as mentioned before in connection with FIG. 10.

One feature of the assembly-transport apparatus according to the present invention is that each one of the workpieces, assembled or machines, after a manufacturing step has been finished is returned to its original compartment of the container at the same time when one of the workpieces to be assembled or worked on, for example machined, in another compartment is distributed into a circular hollow of the rotary table. A mechanism by which the workpieces assembled are sequentially returned to their original compartment is described in connection with FIGS. 7 and 15 where there is shown a cam 60 mounted on the shaft 26 and therefore rotating at the same speed as other cams 30, 40, 50 etc. The cam causes a lever 121 to swing about its pivotal axis and a connecting rod 122 to ascend or descend every time the shaft 26 rotates, thus allowing a thrusting rod 120 to pass through the corresponding circular hollow. Therefore, the frame 10 into which the workpiece is housed is raised up into the compartment of the container 3 directly above the corresponding circular hollow by means of the thrusting movement of the rod 120 due to the revolution of the cam 60. It is, in this case, to be noted that to make possible lifting movement of the frames along the guide columns 15, the projections 15b and 15c hold in engagement with the notches 11b and 11c of the frames 10 because of the swinging movement of the actuating plate 23 caused by the revolution of a pair of cams 30 for operating the shutter ring 19 as mentioned before in connection with the delivery mechanism of the frame onto the rotary work table 5.

Further, under the rotary table 5 there is provided a correcting cam 109, see FIG. 14, which serves to correct positioning of the frames 10 in place during the rotating travel of the rotary table 5 because a frame or work-carrier 10, when delivered into the work-receiving hollow 5, may occupy the wrong position there. The correcting mechanism is such that the correcting cam 109 is followed by a roller 112 provided on a freely rotating ring 110 with the groove 11a of the frame 10 in engagement with a projecting pin 111 of said ring 110.

Thus, the delivery of the workpieces to be assembled from one compartment of the container onto the rotary table occurs at the same time with the storing operation of that assembled into its original compartment thereof; it is to be noted that only two circular hollows 6 stand directly under the corresponding compartment one of which is for reception of a workpiece-carrier and the other for delivery thereof, with the exception of the first assembling process in which only the delivery operation is required. After the delivery and reception operations have been finished as the cams 30 rotate one revolution, the rotary work table 5 turns by one-thirteenth revolution as mentioned before to effect the next delivery and reception processes. The revolution of the shaft 26 repeats these operations during which a worker works on the assembly or works when the workpieces to be assembled or otherwise worked on arrive in front of him.

Referring again to FIGS. 7, 11 and 15, one revolution of the cam 60 causes a wheel 62 fixedly mounted on a shaft 92 to intermittently rotate by one-thirteenth revolution as in the revolution of the rotary table 5 because of the engagement of a projection 61 with a plurality of pins (13 here) equally angularly spaced on a side of the wheel 62. The revolution of the wheel 62, in turn, allows a cam wheel 95 also mounted on the shaft 92 to intermittently turn thereabout by one-thirteenth revolution. The cam wheel 95 has at its peripheral surface a recess for receiving a roller 42, see FIG. 11, fixed to a lever member 41a biased by a spring 41c. With this construction, the lever 41a disengages from a pin 41b to swing about a pivot shaft 41d in a counterclockwise direction when the cam wheel 95 rotates one revolution corresponding to 13 revolutions of the cams 60 and 100 which in turn rotate the rotary table 5 by one revolution. Consequently, the lever 41 swings about the shaft 28 due to the rotation of the cam 40 for fixing the container 3, thus transmitting the turning force through a suitable means 46 to a crank 45 locked on a shifting shaft 80 by means of a lock key 44. Therefore, one revolution of the cam wheel 95 allows the shifting shaft 80 and a lever 82 fixed thereto to turn in the direction of the arrow, see also FIG. 9, so as to chuck the shutter axle 22 of the container 3 by means of a gripper 81 in preparation for transporting the container 3 by one pitch with the shaft 80 shifted as later described.

Figure 12:
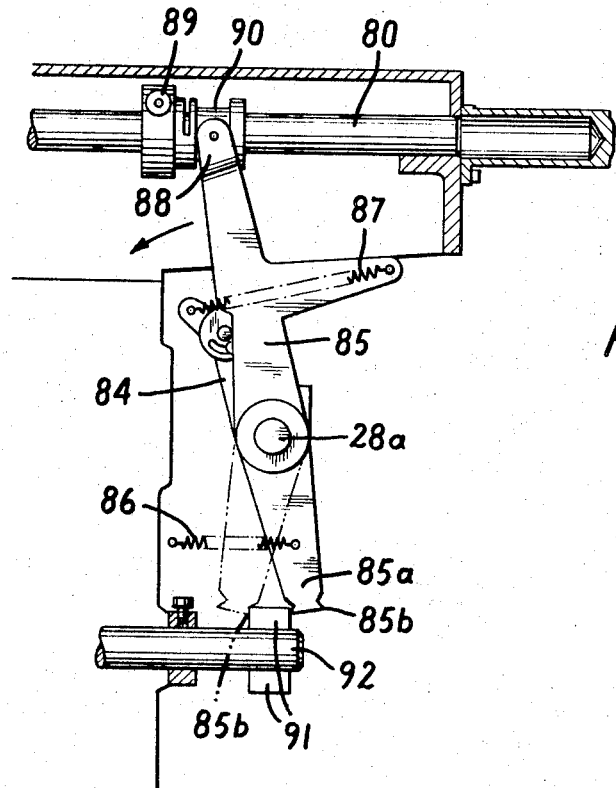
FIG. 12 is a section view taken on section line 12—12 in FIG. 8.
Figure 13:
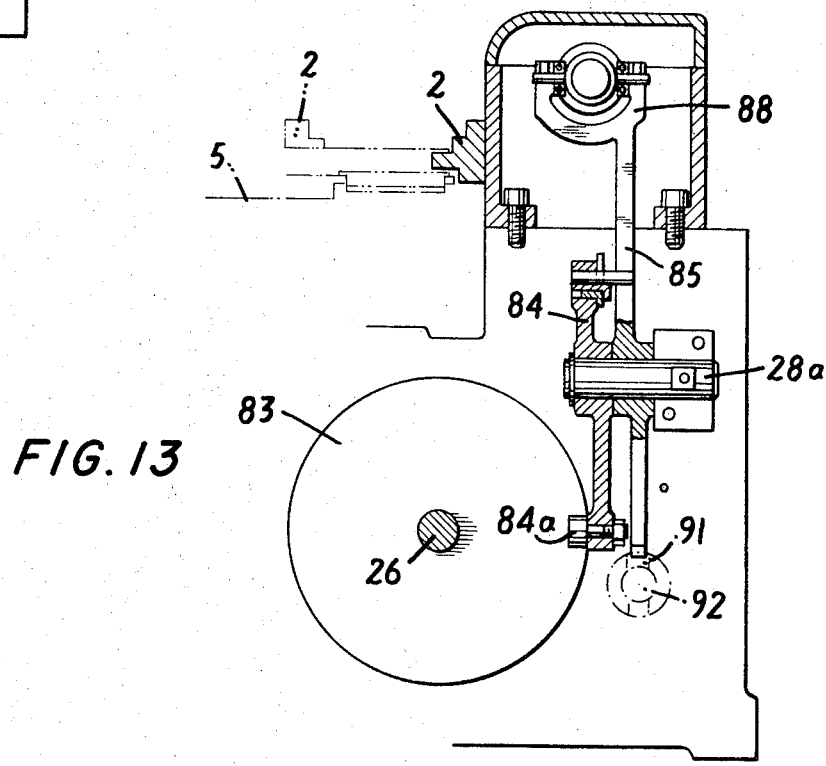
FIG. 13 is a side elevation view of a cam-lever mechanism of FIG. 12.

Referring now to FIGS. 7, 12 and 13, there is shown a shaft transporting mechanism in which levers 84, 85 are provided on a fixed shaft 28a to transport the shifting shaft 80 with the gripper 81 chucking the container 3. The lever 85 has at one end a recess 85b usually in mesh with the notch of a cam 91 fixed to the shaft 92 under the attraction of a spring 86, and at another end a slider 88 in engagement with a recess 90 of a fixture member 89 fixedly mounted on the shifting shaft 80, while the cam lever 84 has at one end a roller in contact with the surface of the lever 85 and a spring 87 attracting lever 85, having at another end a roller 84a in close contact with a cam wheel 83 fixed to the shaft 26 so as to cause the swinging movement of the lever 84. The shifting shaft 80 shifts horizontally from the left to right with the container 3 transported by one pitch in the same direction when the shaft 92 rotates by one revolution corresponding to one revolution of the rotary table 5 as mentioned before because a projection 85a disengaged from the cam 91 to turn the lever 85 in the direction of the arrow by the urging of the spring 87. The shifting shaft 80 may be transported from the right to left as required by engaging the projection 85a with the other side of the cam 91 as shown in dotted lines in FIG. 12. In this case, it should be noted that a pin 49, see FIG. 10, usually serving to fix the container 3 is pushed back into the housing 29 not to obstruct the transportation of the container 3 since the pin 47 is attached to a crank 48 which is in turn mounted on the shifting shaft 80 to push back the pin 49.

After the transportation of a container 3 has been finished, the cam-lever mechanisms, 40 and 50 mentioned before, restore the neutral positions of the gripper 81 and the pin 49, while other cams 30, 60, 100 etc., perform the next delivery and reception operations to sequentially distribute the workpieces to be assembled onto corresponding hollows of the rotary work table 5, respectively, and to stack those assembled into their original compartment of the container 3 which was emptied of the workpieces due to the attainment of the delivery operation in the preceeding assembly or work step or operation. It is, therefore, understood that a completion of one revolution of the rotary work table 5 cause one compartment to be full of the workpieces assembled while another compartment to get emptied of the workpieces since they are distributed onto the rotary table for the operation or assembling or work step to be accomplished thereon.

As mentioned above, according to the present invention, a container, having a plurality of compartments into each of which the workpieces assembled or to be assembled are stacked, can be intermittently transported horizontally along the guide rails every time one assembling operation has been finished with the distributing operation of the workpieces in synchronism with the returning operation thereof, thus bringing about the advantages: that the assembling process according to the invention requires no replacement of the container every time one operation has been achieved; that a plurality of assembling or work operations can be carried out on the work or workpieces by making the rotation of the rotary table reversible with one working table provided with the transporting mechanism and that assembly-line production is established with a plurality of transport-apparatus in series with each other which are transported along the predetermined path whenever one assembly step has been effected.

Those skilled in the art will understand that the present invention permits various modifications and may be given embodiments othe than those particularly illustrated and described herein, without departing from the essential features of this invention.

What I claim and desire to secure by Letters Patent is:

1. An apparatus for transporting work to work stations for assembly and other work operations comprising, a work station having an intermittently driven rotary work table driven rotationally, said work table having work-receiving through openings distributed equally spaced from each other, a container having a plurality of compartments for removably containing therein in stacked relationship work-carriers each having work therein on which work operations are to be performed, said container having a plurality of bottom openings to said compartments, means at said workstation to deliver work-carriers and the work thereon sequentially from a common one of said compartments to deliver them to respective work-receiving openings, shifting means reciprocably moving said container automatically to a position over the work table when the opening of a compartment in which workpieces are to be delivered to said work table is in position for registry with the through openings in said work table, the shifting means including means to shift the container away from said work table after the workpieces from said compartment are delivered to said rotary table and to return the container automatically to said position for return of the workpieces and work-carriers therefore to the same compartment from which they are withdrawn, and means moving automatically cyclically to enter the individual openings of said work table from an underside thereof and move the work-carriers and the work individually into said same compartment in stacked relationship when work operations on the workpieces at said work station are completed.

2. An apparatus according to claim 1, said container having shutter-rings at each of said bottom openings for the compartments, said means at said work station to deliver the work-carriers sequentially to the work table comprising means actuating the shutter rings to deliver the work-carriers and work thereon to said rotary table.

3. An apparatus according to claim 1, in which said container has a plurality of vertically disposed guides in each compartment for releasably holding the work-carriers in stacked relationship and receiving them for releasably holding them in stacked relationship.

4. An apparatus according to claim 3, in which said work-carriers each comprise means cooperating with said guide means for releasably holding the work-carriers on said guides.

* * * * *